US010609029B2

(12) United States Patent
Leconte et al.

(10) Patent No.: US 10,609,029 B2
(45) Date of Patent: Mar. 31, 2020

(54) HIGH ASSURANCE SEGREGATED GATEWAY INTERCONNECTING DIFFERENT DOMAINS

(71) Applicant: Airbus Operations SAS, Toulouse (FR)

(72) Inventors: Bertrand Leconte, Toulouse (FR); Benoit Triquet, Toulouse (FR); Cristina Simache, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 286 days.

(21) Appl. No.: 15/254,279

(22) Filed: Sep. 1, 2016

(65) Prior Publication Data

US 2017/0070507 A1 Mar. 9, 2017

(30) Foreign Application Priority Data

Sep. 4, 2015 (EP) .................................... 15306360

(51) Int. Cl.
*H04L 29/06* (2006.01)
*H04L 12/66* (2006.01)
(Continued)

(52) U.S. Cl.
CPC ........ *H04L 63/10* (2013.01); *H04L 12/40032* (2013.01); *H04L 12/4625* (2013.01);
(Continued)

(58) Field of Classification Search
None
See application file for complete search history.

(56) References Cited

U.S. PATENT DOCUMENTS 5,933,412 A * 8/1999 Choudhury ........ H04Q 11/0478
370/218
6,081,503 A * 6/2000 Bordogna ............. H04L 49/255
370/222
(Continued)

FOREIGN PATENT DOCUMENTS

EP 2428910 3/2012
EP 2677425 12/2013
WO WO2014114232 * 1/2014

OTHER PUBLICATIONS

European Search Report, dated Feb. 10, 2016, priority document.

*Primary Examiner* — Piotr Poltorak
(74) *Attorney, Agent, or Firm* — Greer, Burns & Crain, Ltd.

(57) ABSTRACT

A gateway having an architecture authorizing bidirectional communication between applications located in different domains and presenting a high assurance level of protection. The gateway interconnects a first and second domain. The gateway comprises an internal protocol, first and second protocol adapters hosted within the first and second domains and configured to make a conversion between application data formatted according to an applicative protocol relative to the two domains and gateway data formatted according to the gateway internal protocol, and a security module hosted on a separate platform to communicate with the first and second protocol adapters via first and second data links according to the gateway internal protocol. The first and second protocol adapters and security module are each physically segregated and the security module comprises functional blocs configured to authorize secure bidirectional flow of gateway data along two different and separate unidirectional paths between the two protocol adapters.

9 Claims, 6 Drawing Sheets

(51) Int. Cl.
  *H04L 12/46* (2006.01)
  *H04L 12/40* (2006.01)
  *H04L 12/801* (2013.01)
  *H04L 29/08* (2006.01)

(52) U.S. Cl.
  CPC ............. *H04L 12/66* (2013.01); *H04L 63/02* (2013.01); *H04L 63/107* (2013.01); *H04L 63/1408* (2013.01); *G06F 2221/2101* (2013.01); *H04L 47/196* (2013.01); *H04L 67/02* (2013.01); *H04L 67/40* (2013.01); *H04L 2012/40267* (2013.01)

(56) References Cited

U.S. PATENT DOCUMENTS

| | | | | |
|---|---|---|---|---|
| 6,137,790 | A * | 10/2000 | Bordogna | H04J 3/1611 370/351 |
| 7,055,173 | B1 * | 5/2006 | Chaganty | H04L 41/0654 726/11 |
| 7,062,587 | B2 * | 6/2006 | Zaidi | G06F 15/7832 710/305 |
| 7,181,768 | B1 * | 2/2007 | Ghosh | G06F 21/552 706/25 |
| 7,593,400 | B2 * | 9/2009 | Zelig | H04L 12/4625 370/389 |
| 7,685,633 | B2 * | 3/2010 | Ben-Shachar | H04L 63/029 726/12 |
| 7,784,093 | B2 * | 8/2010 | Deng | H04L 29/06 726/1 |
| 7,890,612 | B2 * | 2/2011 | Todd | G06F 21/577 709/220 |
| 2002/0083191 | A1 * | 6/2002 | Ryuutou | H04L 29/06 709/237 |
| 2002/0083331 | A1 * | 6/2002 | Krumel | H04L 29/06 726/3 |
| 2002/0114316 | A1 * | 8/2002 | Buchanan, Jr. | H04J 3/0608 370/350 |
| 2002/0161907 | A1 * | 10/2002 | Moon | H04L 69/08 709/230 |
| 2003/0117993 | A1 * | 6/2003 | Syvanne | H04L 63/02 370/349 |
| 2005/0114381 | A1 * | 5/2005 | Borthakur | G06F 17/30067 |
| 2005/0273861 | A1 * | 12/2005 | Chess | G06F 21/54 726/25 |
| 2007/0282951 | A1 * | 12/2007 | Selimis | H04L 67/06 709/205 |
| 2007/0283422 | A1 * | 12/2007 | Iyoda | G06F 21/6227 726/4 |
| 2008/0104586 | A1 * | 5/2008 | Thorton | G06F 9/45533 718/1 |
| 2008/0212589 | A1 * | 9/2008 | Yang | H04L 12/2889 370/395.1 |
| 2010/0031325 | A1 * | 2/2010 | Maigne | G06F 9/45533 726/4 |
| 2010/0299742 | A1 | 11/2010 | Decléty et al. | |
| 2011/0035498 | A1 * | 2/2011 | Shah | H04L 12/12 709/226 |
| 2011/0242995 | A1 * | 10/2011 | Zhang | H04L 45/00 370/252 |
| 2012/0066509 | A1 | 3/2012 | Lapp et al. | |
| 2013/0013953 | A1 * | 1/2013 | Eck | G06F 9/45545 714/2 |
| 2015/0256512 | A1 * | 9/2015 | Leconte | H04L 63/02 726/1 |
| 2015/0341255 | A1 * | 11/2015 | Lu et al. | H04L 45/16 370/389 |
| 2016/0056905 | A1 * | 2/2016 | Hartlmueller | H04L 12/40032 375/354 |

* cited by examiner

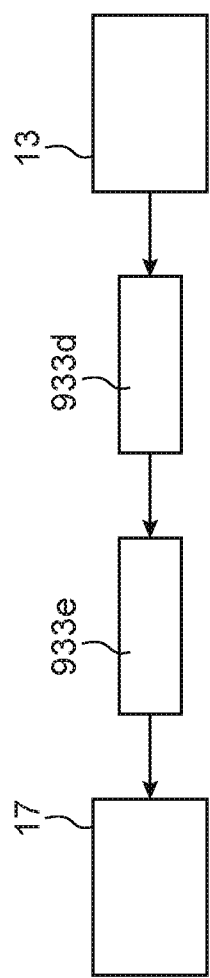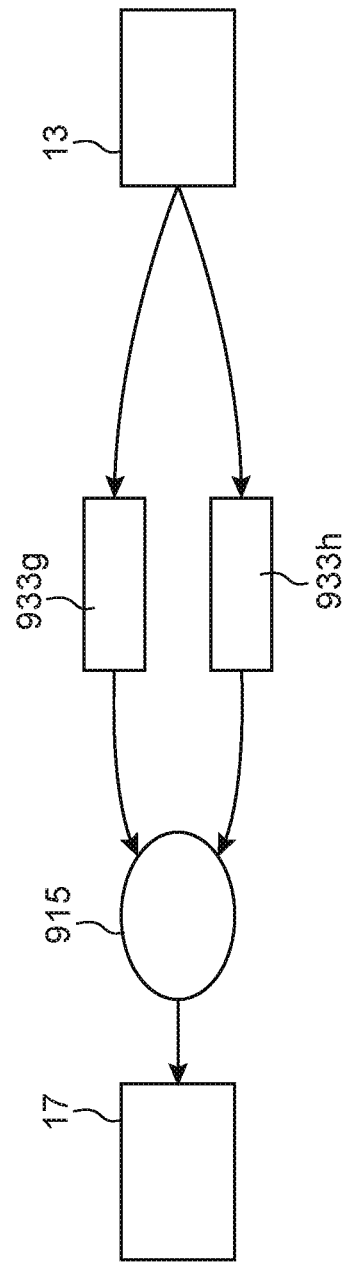

HIGH ASSURANCE SEGREGATED GATEWAY INTERCONNECTING DIFFERENT DOMAINS

CROSS-REFERENCES TO RELATED APPLICATIONS

This application claims the benefit of the European patent application No. 15 306 360.7 filed on Sep. 4, 2015, the entire disclosures of which are incorporated herein by way of reference.

TECHNICAL FIELD

The present invention generally concerns high assurance security gateway interconnecting different domains and particularly in embedded infrastructures.

BACKGROUND OF THE INVENTION

In most industrial fields, it is frequent to have different systems with different applications communicating with each other in order to achieve an assignment. Each application may be considered as a set of functions and each function is a piece of software contributing to execute a part of the task to be accomplished by the application. For example, many different types of equipment in a vehicle or an aircraft need to exchange data with each other through a communication system in order to accomplish the maneuvering of the vehicle or the aircraft. Each type of equipment may have a specific set of functions or applications with different levels of criticality depending on their importance. A specific level of security is associated to each application in function of the criticality of that application. Therefore, it is important and practically useful to establish a mechanism that allows an efficient exchange of information between applications in domains having different security levels without compromising their security.

One solution would consist of physically separating the different applications by hosting each one on a different physical system and connecting them via a network channel. The data exchange via this network channel needs to be controlled by a control means for securing information exchange.

A computing resource of an embedded environment used to be hardly enough to host one function. However nowadays, due to the current growing efficiency of computing resources, the trend is exactly the opposite and consists of putting several applications or functions on the same physical system in order to use the full computing power and memory storage capabilities offered by that system. This enables the avoidance of wasting unused resources and thus reduces the production costs as well as the overall weight of the system which is very important for an aircraft, a satellite or a vehicle. This architecture has however the disadvantage of facilitating the propagation of errors. Indeed, any design or implementation error on one part of the system may lead to failures impacting on other parts of the system. This difficulty is solved, for example, in the aircraft environment by existing IMA (Integrated Modular Avionics) architectures addressing design or implementation error propagation from one part of the system to another in regard to the safety perspective. Moreover, in recent years, virtualization techniques have been developed in order to take into account security aspects relative to malicious attempts. Thus, nowadays the trend is to host several applications on the same physical system by providing a good level of assurance for the strict runtime environment segregation between the different applications. One such security architecture is MILS (Multiple Independent Levels of Security) built upon strict segregation properties for the execution environments and strict communication paths. Indeed, MILS architecture enables a system to host several applications or functions with different or same levels of security without any interference between these applications.

However, the problem remains on how to protect the security of several applications characterized by different security levels while authorizing the bidirectional information exchange between them. For example, if for one reason or another, a part of the system becomes malicious, it is needed to prevent the latter from trying to deliberately damage the other parts of the system.

There exist some security techniques that partly solve the problem of communication with different levels of security. One such a technique is the Bell-La Padula model which addresses confidentiality aspects. This model is based on a "no write down, no read up" strategy. In other words, a first domain with a high security level is not allowed to write or communicate any data to a second domain with a low security level but is allowed to read data from the latter. On the other hand, the second domain with a low security level is not allowed to read data from the first domain with a high security level but is authorized to write data into it.

Another known method is the Biba integrity model defining a set of access rules designed to ensure data integrity. This model is based on a "no read down, no write up" strategy. In other words, a first domain with a high security level is not allowed to read or use any data from a second domain with a low security level. On the other hand, the second domain is not allowed to write or communicate any data to the first domain with a higher security level.

It is clear that the above two models cannot be implemented simultaneously. Thus, in order to authorize a bidirectional communication between two domains respecting both models at the same time, complex application level proxies should be implemented. However, complex proxies are very difficult to analyses at high assurance levels.

Indeed, the difficulty in certifying complex proxies is reasoned by their software architecture, since they consolidate several functionalities and are implemented by a significant amount of software code (i.e., several hundreds of thousands lines of code). The Common Criteria standard provides a framework and guidance for the security certification of computer systems. This standard defines seven EALs (Evaluation Assurance Levels). EAL 7 provides the highest level of assurance but also requires formal modelling of the system under evaluation. Security evaluations presenting a level higher than EAL 4 are internationally not recognized. Thus, a system claiming high EAL levels requires multiple certifications from the different countries where the system is to be used.

The purpose of the present invention is therefore to propose a gateway having an architecture which authorizes a bidirectional communication between applications located in different domains (that might have different security levels), presents a strong segregation properties and a high assurance level of protection, efficiently uses hardware resources, is adapted to be used in an embedded environment, and allows an easier security certification by external authorities without having the aforementioned shortcomings.

SUMMARY OF THE INVENTION

The present invention is defined by a gateway adapted to interconnect a first domain to a second domain, the gateway comprising:

a gateway internal protocol, first and second protocol adapters intended to be hosted respectively within the first and second domains and configured to make a conversion between an application data formatted according to an applicative protocol relative to the first and second domains and a gateway data formatted according to the gateway internal protocol, and a security module hosted on a separate hosting platform and intended to communicate with the first and second protocol adapters via respectively first and second data links according to the gateway internal protocol, wherein the first protocol adapter, second protocol adapter and security module are physically segregated from each other and wherein the security module comprises a set of functional blocs configured to authorize secure bidirectional flow of gateway data along two different and separate first and second unidirectional paths between the first protocol adapter and the second protocol adapter.

Thus, the gateway according to the invention enables a bidirectional and highly secure communication along two different unidirectional routes between applications located into two different domains and potentially having different security levels. In particular, the physical segregation between the first protocol adapter, the second protocol adapter and the security component ensures non-interference activities throughout any type of failure such as, exhaustion of hardware resources or buffer overflow due to implementation bugs that might occur during a normal activity. It also protects against malicious actions that could be generated by an attacker who might have succeeded in getting the components of the less secured domain under control and who would have tried to attack the highly secured domain. In particular, if an attacker gets the less secured domain under control, he cannot reach the highly secured one without crossing the security module. In contrast, if all the components were on the same platform or on the same operating system, one may suspect that an attacker might succeed in bypassing the security module by using some features of the operating system or the common platform.

The present invention concerns also an embedded infrastructure (for example, a computer) comprising the gateway according to the above characteristics.

In addition, the invention concerns an aircraft communication system comprising the gateway according to the above characteristics.

BRIEF DESCRIPTION OF THE DRAWINGS

Other characteristics and advantages of the invention will become apparent on reading preferred embodiments of the invention given with reference to the appended figures among which:

FIGS. 4A and 4B schematically illustrate different configurations of elementary filtering components, according to different embodiments of the invention;

DETAILED DESCRIPTION OF THE PREFERRED EMBODIMENTS

The concept of the invention comprises proposing a gateway composed of physically segregated modules comprising first and second modules for managing application-related exchanges and a security module communicating with the first and second modules via an internal communication protocol wherein, the security module is decomposed into sufficiently small components that can be easily evaluated and that allow bidirectional flow of data along two different unidirectional paths.

Figure 1:
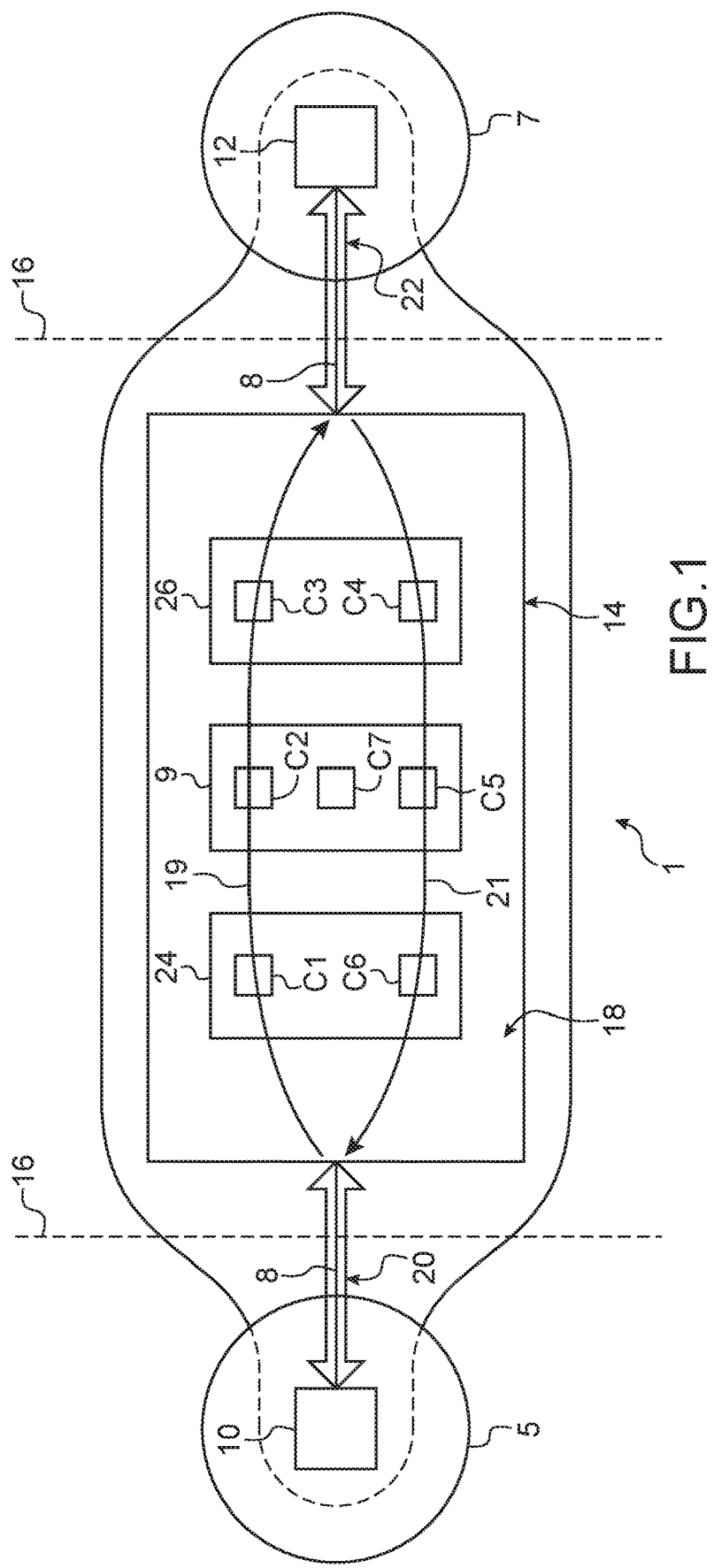
FIG. 1 schematically illustrates a gateway adapted to interconnect two domains potentially with different security levels according to the invention.

FIG. 1 schematically illustrates a gateway adapted to interconnect two domains with different security levels according to the present invention.

The gateway 1 is adapted to interconnect different domains 5, 7 with potentially different security levels. For simplicity reasons, the example of FIG. 1 shows a first domain 5 adapted to be communicating with a second domain 7 but of course, the first domain 5 can also communicate with a third domain (not shown) and the second domain 7 can equally communicate with a fourth domain (not shown), etc.

According to the invention, the gateway 1 comprises a gateway internal protocol 8, first and second protocol adapters 10, 12, and a security module 14. The first protocol adapter 10, the second protocol adapter 12 and the security module 14 are physically segregated 16 from each other. This ensures a non-interference property between the first protocol adapter 10, the second protocol adapter 12 and the security module 14.

The gateway internal protocol 8 is a very simplified protocol that specifies the communication protocol between the security module 14 on one hand and each one of the first and second protocol adapters 10, 12 on the other hand.

The first and second protocol adapters 10, 12 are hosted respectively within the first and second domains 5, 7 in order to manage the application-related exchanges. In particular, they are configured to make a conversion between an application data formatted according to an applicative protocol relative to the first and second domains 5, 7 and a gateway data formatted according to the gateway internal protocol 8.

Finally, the security module 14 is hosted on a separate hosting platform 18 and is intended to communicate with the first and second protocol adapters 10, 12 via respectively first and second data links 20, 22 according to the gateway internal protocol 8. The security module 14 comprises a set of functional blocs 9, 24, 26 configured to authorize secure bidirectional flow of gateway data along two different and separate first and second unidirectional paths 19, 21 between the first protocol adapter 10 and the second protocol adapter 12.

According to a preferred embodiment, the hosting platform 18 is a virtualization platform of a MILS type. The security module thus takes advantage of strong segregation properties and specified communication channels of such a platform in order to host several functions simultaneously.

It is recalled that a virtualization platform, developed for high assurance needs, is based essentially on strict segregation and non-interference properties between the different functions. Indeed, a virtualization platform offers the possibility to create isolated runtime environments (generally called partitions) for each function. It also offers strong temporal and spatial segregation between the partitions (i.e., non-interference properties between hardware and software resources shared by the different functions). Moreover, it provides secure communication means between different partitions hosted by the platform as well as secure communication means (for example, network interfaces) between one or more partitions of the platform and the outside domains. A virtualization platform can be built by using software and/or hardware virtualization techniques such as a MILS Separation Kernel or any other virtualization Operating System fulfilling the above properties. The hardware part of the platform comprises, as usual, communicating buses (not shown) interconnecting one or more processing units (not shown), storage devices (not shown), and one or more (possibly virtualized) network interfaces (not shown), as well as a specific hardware module (not shown) for managing direct memory access such as an IOMMU (Input Output Management Memory Unit).

According to another embodiment, the hosting platform 18 may just be made up of a bare-metal platform offering the possibility of creating isolated partitions.

Advantageously, the set of functional blocs 9, 24, 26 of the security module 14 is decomposed into a plurality of elementarily evaluable components c1-c7. By an elementarily evaluable component (hereafter called elementary component) is meant a sufficiently small component to be analyzable or evaluable. In other words, it means that its code complexity is so simple that the analysis of that component is easy to conduct by associating a model (for example an analytical model or a formal method) to a given implementation and prove its correctness with regard to the component specification. In particular, formal methods are appropriate for characterizing elementary components at a high assurance level. As an example, a component having less than approximately 8000 lines of code (LOC) of a high level language is considered as sufficiently small to be evaluable by formal methods. It is to be noted that the smaller the component is, the simpler and thus, the easier it is to prove the correct implementation of its function.

The size and thus the complexity of an elementary component is limited in order to reach the required level of assurance (EAL). A higher assurance level (i.e., providing a higher assurance that a given function is implemented correctly) needs higher certification efforts and, thus, a smaller component would be more advantageous for handling affordable certification costs.

Moreover, each elementary component has a well specified or defined function (i.e., it knows exactly what to do in any situation). The elementary component is also adapted to communicate with other predefined elementary components. In other words, it has well defined interfaces for communicating with other well identified components to which it is authorized to do so. Thus, the basic security-enhancing property is that these elementary components can only interact among each other via well-defined internal communication paths, while all other unintended interference of those components among each other is forbidden. In particular, a first subset of elementary components is intended to be used along the first directional path and a different second subset of elementary components is intended to be used along the second directional path.

Thus, the set of functional blocs 9, 24, 26 is configured to authorize secure bidirectional flow of data along two different and opposite unidirectional paths 19, 21 between the first protocol adapter 10 and the second protocol adapter 12.

Thus, the gateway 1 is well adapted for environments requiring high levels of security certification. It offers very strict separation with strict controlled communication between first and second domains and can deliver an assurance level EAL higher than 5. Moreover, the physical separation of the modules processing applicative protocols (i.e., protocol adapters 10, 12) from those managing security issues (i.e., security module 14) and the use of a simple gateway internal protocol 8 for communication between them decreases the complexity of the security module 14 and drastically reduces its attack surface.

In comparison, prior art virtualization platforms cannot provide proofs needed for an EAL higher than 5. Moreover, managing complex applicative protocols and security components on the same platform would increase the security module complexity and thus would increase the risk of security flaws that can be exploited by a potential attacker.

Figure 2:
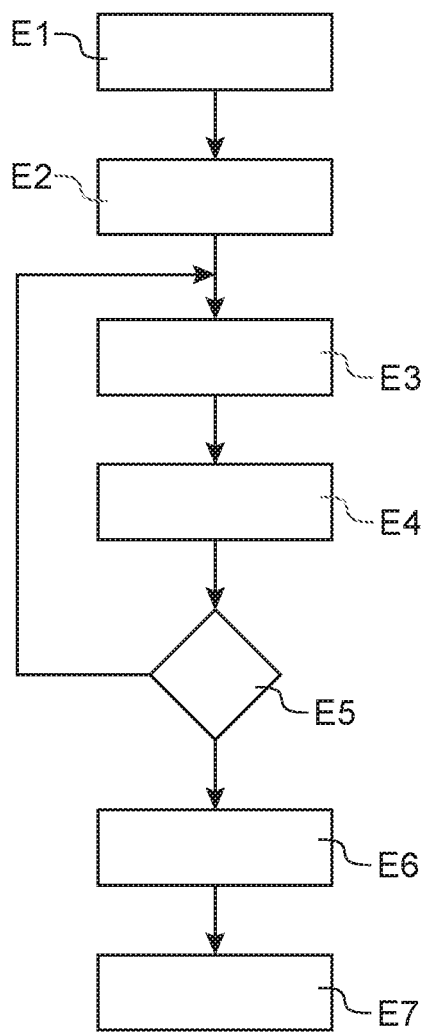
FIG. 2 is a flow chart illustrating a method for constructing a gateway according to the embodiment of FIG. 1.

FIG. 2 is a flow chart illustrating a method for constructing a gateway according to the embodiment of FIG. 1.

Step E1 concerns the definition of a simplified gateway internal protocol 8 that minimize the surface of any potential attack. In particular, the gateway internal protocol 8 is configured to have a minimum communication protocol. By a minimum communication protocol is meant a protocol based on a query and a response exchange mechanism without any complex protocol exchanges between the components and wherein each frame of an exchanged gateway data is decomposed into predefined fields of a fixed length. To be more specific, the protocol needs no frame interpretation, the frame is just split into predefined fields and the protocol payload contains data in predefined fields of fixed length without any dynamic field spans.

Thus, the gateway internal protocol is defined to be as simple as possible, involving a better determinism with respect to the security requirements. This simplicity allows easy updating of the gateway internal protocol and security filtering rules to integrate new applicative-related protocols.

According to one embodiment, the gateway internal protocol bidirectional interactions are limited at the transport level to an exchange of a query and a response.

Indeed, at the transport level, it uses a connectionless transmission model with minimum protocol mechanisms. In other words, there are no prior communications to set up special transmission channels or data paths and the transmission is stateless (i.e., without any guarantee of delivery or error checking). Indeed, avoiding the overhead of such processing at the network level decreases the code complexity. For example, in order to avoid transmission flow and error management, a connectionless protocol such as the UDP (User Datagram Protocol) is used instead of the connection-oriented protocol TCP (Transmission Control Protocol). UDP provides checksums for data integrity and port numbers for addressing different functions at the source and destination of a message.

At the application layer, messages exchanged between two entities are independent from each other. There is no state to manage at the applicative layer and it's up to the sender/receiver to deal with missing frames or wrongly received ones.

Moreover, at the applicative level, the exchanged messages can use a widely known format for Physical, Data link, Network and Transport OSI layers. For the remaining part of the frame, it can use well defined encoding rules according to which all fields of the frame have a predefined size (i.e., a fixed length). In addition, each field may have a given value among a set of known values except the application-linked data part of a file transfer (i.e., the content of a data block of the file).

Additionally, native byte ordering (native endianness) of the hosting platform 18 of the security module 14 is used as the byte ordering for the gateway internal protocol 8. This implies the non-encoding of data in a generic format before sending them to the security module 14. Thus, the security module 14 does not have to do any decoding of data and the needed conversion is implemented by the protocol adapters 10, 12.

On the other hand, each message contains several fields. However, based on a single field value, the rest of the applicative fields can be interpreted due to the known structure, the significance of the fields, and the predefined values (predefined template or cookie cutter).

For example, the gateway internal protocol 8 can be of the type RPC (Remote Procedure Call). Indeed, the RPC is only concerned with the specification and interpretation of messages. It is independent of transport protocols because it needs no information on how a message is passed. The transport layer can be UDP which is very simple compared to TCP. In particular, the ONC-RPC (Open Network Computing RPC) using UDP which is one of the simplest implementation of RPC is a good candidate because it is neither language dependent nor Operating System dependent. It is efficient, widely used and well understood and can be used to send a request with simple parameters and can be easily filtered.

On the other hand, the gateway internal protocol is configured to allow also unidirectional transmission or broadcast (i.e., transmission with no reply).

Step E2 of the flow chart concerns the definition and analysis of the security module 14. For example a set of functional blocs 9, 24, 26 are defined and analyzed in order to authorize secure bidirectional flow of data along two different unidirectional paths 19, 21. These functional blocs 9, 24, 26 are configured to run on a hosting platform 18 (for example, a virtualization platform of MILS type or any other platform that ensures strong segregation properties) and comprise driving blocs 24, 26 adapted to receive and send gateway data along the two different unidirectional paths 19, 21, and an analyzing bloc 9 adapted for analyzing application-level protocol data flow security.

Steps (E3-E5) concern an iterative decomposition of the set of functional blocs 9, 24, 26 into a plurality of elementarily evaluable components c1-c7.

In particular, in step E3 each functional bloc 9, 24, 26 is decomposed into smaller functional components c1-c7 having well defined functions. The functional components are adapted and allowed to communicate with each other according to well specified authorization rules.

For example, for a given protocol, a set of security rules to be implemented by a functional bloc is subdivided into several distinct subsets each one corresponding to a distinct functional component having only very few elements (i.e., one or two rules).

In step E4, the complexity of each functional component is determined. For example, the number of branches and/or the number of lines of code (LOC) are estimated for each component in order to determine whether the component is small enough to be analyzable according to the assurance level chosen for that component.

Step E5 is a stop criteria testing whether all functional components c1-c7 are elemental (i.e., small enough to be analyzable at the desired level of assurance noting that different components may be evaluated at different levels of assurance). If the output of the test is no, then steps E3-E5 are repeated, whereas, if it is yes, then the final architecture of the security module 14 is determined in step E6. The resulting security module 14 is thus an efficient combination of simple elementary components c1-c7 easy to evaluate and hosted on a hosting platform 18.

It is to be noted that the elementary components c1-c7 can be developed and certified independently of each other and thus, the security module 14 can be updated at any time by introducing new elementary components. An update of one or more components of the security module 14 may be triggered by events such as the detection of a potential vulnerability of an elementary component, the modification of the function of an existing component (e.g., modification of security rules to be applied by a given component), or the addition of new components enhancing the overall function of the security module 14.

Step E7 concerns the definition of the first and second protocol adapters 10, 12 based on the applicative flows of data that are allowed to cross the security module 14. It defines the respective proxies and protocol translation into the gateway internal protocol 8.

In particular, the first and second protocol adapters 10, 12 play similar roles and are defined to manage authorized applicative protocols from the application point of view. Each protocol adapter 10, 12 defines the session management (i.e., open, close, acknowledge, notify errors, etc.) with the application inside the associated domain 5, 7.

Moreover, for each accepted applicative protocol, an application message is adapted from an applicative protocol format into the gateway internal protocol format. At a first step, the application message is split into fields as per the applicative protocol. Then, at a second step, useful fields (as per the applicative protocol format rules) are identified along with the associated security rules to be applied on each field. During the fields processing, if they are good formatted, they are used for the gateway internal protocol format. The adapted message (i.e., gateway data) will be sent to the security module 14 by using the gateway internal protocol 8. Implicitly, some of the actions performed during these steps can be categorized as security-related functions due to the fact that mal formatted messages are directly discarded without sending them to the security module 14. Moreover, security mechanisms against DoS (Deny of Service) can be implemented at the protocol adapter within the domain of low security level knowing that the higher security domain cannot contain an attacker. Typically, a potential attacker uses a low security domain in order to attack a domain presenting a higher security level.

On the other hand, the first and second protocol adapters 10, 12 are configured to rebuild the applicative protocol with data from the internal gateway protocol 8.

Figure 3:
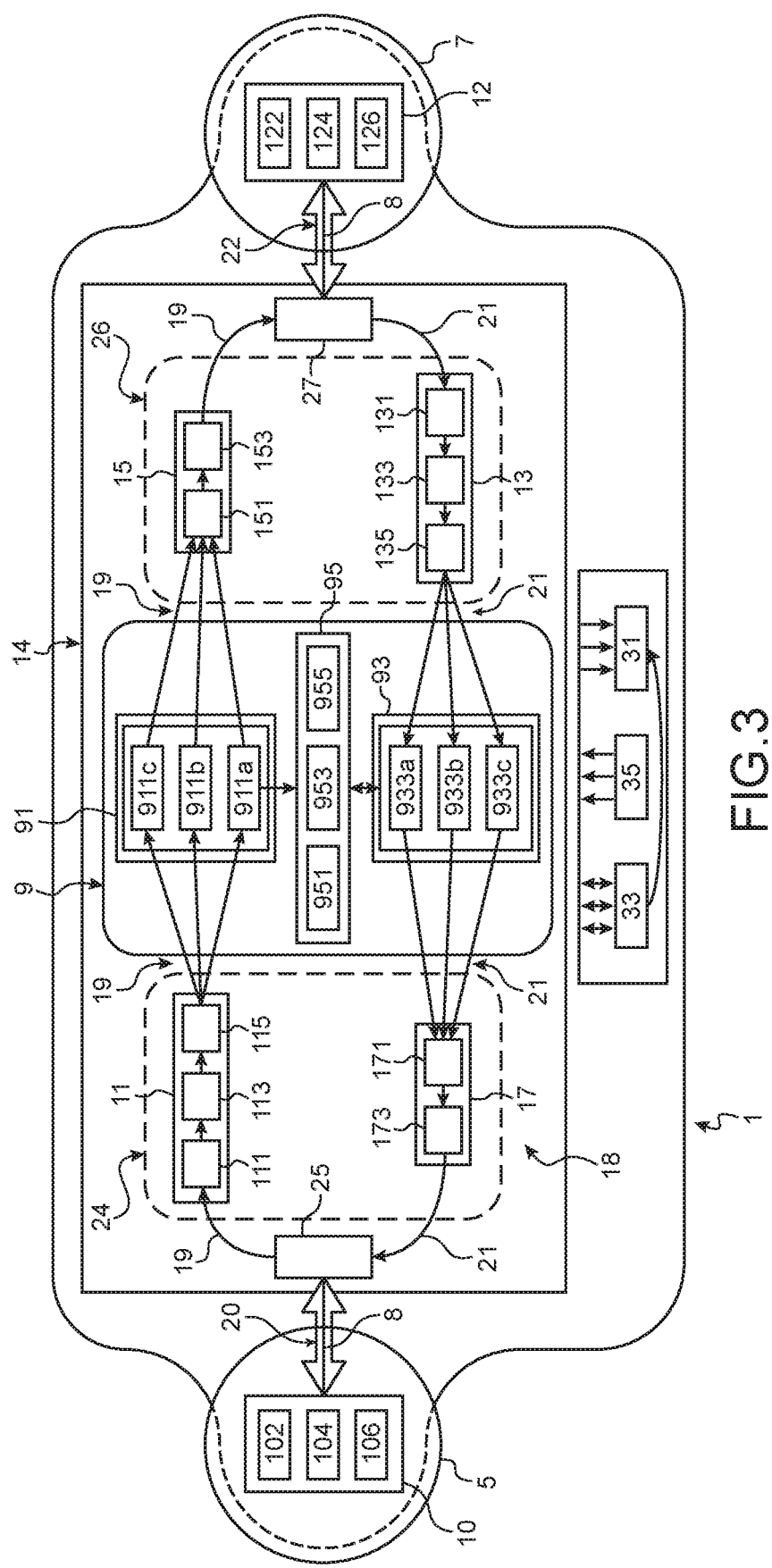
FIG. 3 schematically illustrates a gateway adapted to interconnect first and second domains with different security levels according to a first embodiment of the invention.

FIG. 3 schematically illustrates an example of a gateway adapted to interconnect first and second domains with different security levels according to an embodiment of the invention.

According to this embodiment, the first domain 5 is characterized by a security level higher than that of the second domain 7. From a security point of view, this means that the assets of the first domain 5 are considered as much more important and more valuable than those of the second domain 7. The assets of a given domain are the applications, functions or data hosted by that domain. Obviously, the comparison between the security levels of the two domains 5, 7 is simple when both of them belong to the same infrastructure (an aircraft, a satellite, a boat or a vehicle) which is normally the case.

The first and second protocol adapters 10, 12 are hosted within the first and second domains 5, 7 respectively and comprise first and second elementary management components 102, 122 respectively, first and second elementary constructing components 104, 124 respectively, and first and second elementary reconstructing components 106, 126 respectively.

Each one of the first and second elementary management components 102, 122 is configured to manage authorized applicative protocols relative to applications belonging to its corresponding domain (i.e., applications belonging to the first domain 5 for the first elementary management component 102 and applications belonging to the second domain 7 for the second elementary management component 122).

Moreover, each one of the first and second elementary constructing components 104, 124 is configured to construct a gateway data out of a corresponding application data by adapting the application data from an applicative protocol format into the gateway internal protocol format before sending the gateway data to the security module 14 via the first data link 20 or the second data link 22.

On the other hand, each one of the first and second elementary reconstructing components 106, 126 is configured to reconstruct an application data according to the applicative protocol format out of a corresponding gateway data formatted according to the internal gateway protocol 8.

The security module 14 is hosted on a hosting platform 18 (for example, a virtualization platform of MILS type) and is configured to authorize secure bidirectional flow of data along two different and independent unidirectional paths 19, 21 between the first and second protocol adapters 10, 12. In particular, the security module 14 has to ensure that during the communication between the first and second protocol adapters 10, 12, the security of the first domain 5 hosting the first protocol adapter 10 is not damaged by potential threats that might be initiated by the second domain 7 which is characterized by a lower security level. Thus, in a first place, the integrity and availability of assets located in the first domain 5 has to be protected by the gateway 1 and only in a second place, is considered the availability of the communication between the two domains 5, 7.

The example of FIG. 3 shows that the security module 14 comprises a first driving bloc 24 of elementary components, a second driving bloc 26 of elementary components, an analyzing bloc 9 of elementary components, and first and second network interface cards NIC (or components) 25, 27. All elements (i.e., elementary components and network interface components) are well defined and communicate with each other or with the underlying hosting platform 18 according to a well-defined Application Programming Interface (API) that clearly specifies the interaction between these elements. For example, in an avionic environment, the API can be a subset of an ARINC 653, POSIX or MILS API standards.

Each elementary component can be implemented in one or several partitions provided by the platform 18 hosting all partitions simultaneously.

Each one of the first and second driving blocs 24, 26 is configured to receive and send gateway data from and to the corresponding protocol adapter 10, 12 (i.e., first or second protocol adapter) along the first and second unidirectional paths 19, 21.

Advantageously, the first driving bloc 24 is actually made up of two separate blocs composed of a first receiving bloc 11 of elementary components 111, 113, 115 and a first transmitting bloc 17 of elementary components 171, 173. The first receiving bloc 11 is configured to receive gateway data from the first protocol adapter 10 along the first unidirectional path 19. The first transmitting bloc 17 is configured to send gateway data to the first protocol adapter 10 along the second unidirectional path 21.

Similarly, the second driving bloc 26 is made up of two separate blocs composed of a second receiving bloc 13 of elementary components 131, 133, 135 and a second transmitting bloc 15 of elementary components 151, 153. The second receiving bloc 13 is configured to receive gateway data from the second protocol adapter 12 along the second unidirectional path 21. The second transmitting bloc 15 is configured to send gateway data to the second protocol adapter 12 along the first unidirectional path 19.

The analyzing bloc 9 is made up of a first set 91 of elementary components 911$a$-911$c$, a second set 93 of elementary components 933$a$-933$c$, and a third set of elementary components 951-955, configured to analyses and implement a series of security rules at the gateway internal protocol level on gateway data flowing along at least one unidirectional path to ensure that no malicious or unauthorized data is flowing along that at least one unidirectional path.

The entry ends of the security module 14 are the first and second network interface components 25, 27 configured to communicate with the first and second protocol adapters 10, 12 within the first and second domains 5, 7 respectively. The first network interface component 25 is connected to the first receiving bloc 11 and to the first transmitting bloc 17. The second network interface component 27 is connected to the second receiving bloc 13 and to the second transmitting bloc 15.

The first receiving bloc 11 comprises a first elementary stack receiver component 111, a first elementary flow security receiver component 113, and a first elementary flow dispatch receiver component 115.

The first elementary stack receiver component 111 is configured to process an incoming flow of gateway data frames from the first protocol adapter 10 by copying the received gateway data frames into an internal memory to avoid data modification by the hardware during processing and by interpreting the format of each gateway data frame into separate gateway data fields before sending them to the first elementary flow security receiver component 113.

It is to be noted that the elementary stack receiver component 111 is a piece of software which is able to receive data formatted as per OSI (Open Systems Interconnection Standard) model without implementing the generic stack for data treatment at each OSI abstraction layer as it is usually done in computers. The elementary stack role is only to interpret the format of each gateway data frame into predefined gateway data fields without any interpretation of the content and to send the gateway data fields to the first elementary flow security receiver component 113 for further processing.

Indeed, the first elementary flow security receiver component 113 is configured to receive the gateway data fields from the first elementary stack receiver component 111, to copy useful gateway data fields necessary for addressing the communication partners into an internal structure (not shown), and to apply network security rules onto these useful gateway data fields. The network security rules comprise rules for checking that the destination and/or source of the gateway data fields is authorized. They may also comprise rules for checking that there are no malformed gateway fields at the network level. The received gateway data fields are discarded if they do not fulfill the network security rules.

The first elementary flow dispatch receiver component 115 is configured to receive the useful gateway data fields and to dispatch them to the appropriate elementary components of the analyzing bloc 9.

Similarly, the second receiving bloc 13 comprises a second elementary stack receiver component 131, a second elementary flow security receiver component 133, and a second elementary flow dispatch receiver component 135. All these components have equivalent functions to those in the first receiving bloc 11 but with respect to the second interface component 27.

The analyzing bloc 9 comprises first and second sets of elementary controlling components 91, 93 and a third set of associated elementary stateful context components 95 (951, 953, 955). Three elementary components of each set are illustrated just as an example and of course the number of components is not limited and depends on the overall gateway function.

The first set of elementary controlling components 91 comprises a first set of elementary observing components 911 (911a-911c) configured to gather information on data flowing along the first directional path 19 (i.e., from the first protocol adapter 10 to the second protocol adapter 12) and to transmit it to the associated set of stateful context components 951-955 which is configured to store the information. Each elementary observing component (911a-911c) corresponds to a predetermined application-level protocol. Advantageously, an elementary observing component 911a-911c can be further decomposed into a set of elementary observing subcomponents (not shown).

The second set of elementary controlling components 93 comprises a second set of associated elementary filtering components 933 (933a-933c) configured to implement a series of strong application security rules before allowing or disallowing the flow of gateway data from the second protocol adapter 12 towards the first protocol adapter 10 along the second unidirectional path 21. Each elementary filtering component (933a-933c) corresponds to a predetermined application-level protocol. The series of application security rules comprises first consulting rules intended to consult the information stored in the associated set of stateful context components 951-955. Advantageously, one or more elementary filtering components 933a-933c can be composed of a set of elementary filtering subcomponents (not shown) connected to each other in series, each elementary filtering subcomponent implementing a subset of the application security rules. For example, each elementary filtering subcomponent is adapted to take a decision on a given level of the application protocol and is adapted to interact with the corresponding stateful context component 951-955. Thus, a gateway data flow is allowed to cross the security module 14, only if it is authorized by all the elementary filtering subcomponents part of the associated elementary filtering component 933a-933c.

Advantageously, a diversification methodology can be used for increasing the level of confidence in an elementary filtering component 933a-933c.

Indeed, FIGS. 4A and 4B schematically illustrate different configurations of elementary filtering components, according to different embodiments of the invention.

For example, for a given application protocol, the function of an elementary filtering component can be implemented into two or more elementary filtering components connected in series or in parallel.

The example of FIG. 4A shows first and second elementary filtering components 933d, 933e defining two different implementations of the same function connected in series. It is clear that the second elementary filtering component 933e starts analyzing the gateway data flow only if it has already been authorized by the first elementary filtering component 933d.

More generally, the set of associated elementary filtering components may comprise a plurality of subsets of elementary filtering components, each subset being composed of two or more elementary filtering components connected to each other in series.

The example of FIG. 4B shows two elementary filtering components 933g, 933h defining two different implementations of the same function connected in parallel. In that case, an elementary voter component 915 is needed to compare the outputs of the two elementary filtering components 933g and 933h. In order to protect the integrity of the destination domain 5, the elementary voter component 915 forwards the data flow only if it has been authorized by both elementary filtering components 933g, 933h.

More generally, the set of associated elementary filtering components 933 may comprise a plurality of subsets of elementary filtering components, each subset being composed of two or more elementary filtering components connected to each other in parallel and the outputs of the parallel elementary filtering components being connected to an elementary voter component.

As a variant, the elementary voter component 915 comprises a reference model defining authorized requests. The output of each elementary filtering component 933g, 933h is thus compared to the reference model and the gateway data flow is forwarded to the transmitting bloc 17 only if a perfect match has been found. This embodiment increases the integrity protection and level of trust in case a flow of gateway data has been fraudulently authorized by two corrupted elementary filtering components that should have normally prohibited the flow of that data.

Also in another embodiment, the elementary voter component 915 is configured to directly forward the flow of gateway data when at least one of the two elementary filtering components 933g, 933h has answered. This enables an increase of the overall availability of the gateway 1 by temporarily masking latency problems or failures of some components.

It is to be noted that the parallel configuration of FIG. 4B provides more efficient CPU utilization due to the fact that the security module 14 architecture is based on a hosting platform 18 using static scheduling of partitions in the preferred embodiment. In other embodiments, dynamic scheduling may be used.

In other respects, the second transmitting bloc 15 comprises a second elementary flow transmitter component 151 and a second elementary stack transmitter component 153. Similarly, the first transmitting bloc 17 comprises a first elementary flow transmitter component 171 and a first elementary stack transmitter component 173.

The second elementary flow transmitter component 151 is configured to gather gateway data fields from the corresponding elementary controlling components 91 and to assemble the different gateway data fields into gateway data frames.

Furthermore, the second elementary stack transmitter component 153 is configured to receive the gateway data frames from the second elementary flow transmitter component 151 and to send them to the second protocol adapter 12 via the second network interface component 27 and the second data link 22.

Similarly, the first elementary flow transmitter component 171 and the elementary stack transmitter component 173 are equivalent to those in the second transmitting bloc 15 but with respect to the first network interface component 25.

Advantageously, the decomposition of the security module 14 into elementary components (each having a precise and simple function enforcing its correct and secured implementation locally), allows identifying their level of security. In other words, the level of security needed for each of these elementary components is easily determined with respect to its locally implemented function. These code security levels can be classified into four categories comprising a "high security level," a "medium security level," a "low security level" and finally a "not necessarily trusted." A component presenting a "high security level" means that its implementation is correct and effective (with respect to a good specification), exempt of malicious code and, ideally exempt of vulnerabilities. As zero vulnerability goals for a piece of software is almost impossible to achieve, the implementation has to prove that known vulnerabilities are impossible to be exploited.

The other security levels ("medium security level," "low security level" and "not necessarily trusted") are defined according to the number of missing characteristics with respect to the "high security level." Nevertheless, for all these levels it has to be certified that the implementation of each elementary component presents no malicious code. However, the code correctness and invulnerability are more or less guaranteed in function of the security level.

Certainly, the "high security level" is attributed to the elementary components of the analyzing bloc 9 knowing that the first domain's integrity relies primarily on them. Indeed, the elementary observing components 911a-911c, the elementary stateful context components 951-955 and the elementary filtering components 933a-933c are configured to implement the main security rules at an application-protocol level on the gateway data exchanged between the first and second protocol adapters. These elementary components (911a-911c, 951-955, 933a-933c) are thus correctly and effectively implemented with respect to a high standard specification and are exempt of malicious code and known vulnerabilities.

However, the network interface components 25, 27, the elementary flow security receiver components 113, 133 and the elementary flow dispatch receiver components 115, 135 can be categorized in the "low security level" as they have a less important role in the gateway data flow analysis than the analysis bloc 9.

Finally, the elementary stack receiver components 111, 131, the elementary flow transmitter components 151, 171 and the elementary stack transmitter components 153, 173 can be categorized as "not necessarily trusted." Indeed, the elementary stack receiver components 111, 131 are almost the first entry points of the security module 14 and thus, it can be considered that an external malicious data may succeed in attacking them but, thanks to the high security level components, the attack would not be able to propagate through the security module 14 into the other end. The flow transmitter components 151, 171 and the elementary stack transmitter components 153, 173 do not apply any security rules on the gateway data flow and their roles are restricted to preparing and sending the gateway data flow via the network interface components 25, 27. Indeed, if a highly improbable malicious data flow succeeds in arriving into these transmitter components, it would already be too late to stop the attack.

Advantageously, the security component further comprises an audit component 31, a monitoring component 33 and a self-testing component 35. These components are not involved in processing the gateway data flow between the first and second protocol adapters 10, 12 but they have the role of supervising the correct functioning of the security module 14 itself during its lifespan.

In particular, the audit component 31 is configured to gather audit logs from all other elementary components for forensic analysis. The monitoring component 33 is configured to health monitor all sets of elementary components and to take decisions in case anomalies, failures or unusual behaviors are detected. Finally, the self-testing component 35 is configured to test elementary components by injecting test data. Its role is to test the correct performance of the elementary components during a security check. The self-testing component 35 works in collaboration with the monitoring component 33 for self-testing the elementary components of the security component when of course there is no gateway data flow initiated by anyone of the first and second protocol adapters 10, 12 within the first and second domains 5, 7.

Advantageously, the audit, monitoring and self-testing components 31-35 can be hosted by the hosting platform 18 preventing thus any interference between these components in an embedded environment.

The audit component 31 can be categorized in the "low security level" as its role of gathering logs from all other components is considered to be passive. In contrast, a "medium security level" can be attributed to the monitoring and self-testing components 33, 35 which have more active roles but of course less than the analyzing bloc 9. In fact, any misbehavior of these components will be detected by the analyzing bloc 9 who will directly reject any malformed or malicious data initiated by them. In particular, a malicious data may only come from the self-testing component 35 knowing that the interaction of the monitoring component 33 with any other component cannot be considered as malicious. However, superfluous self-testing activities may potentially be wrongly initiated by a command from the monitoring component 33. Nevertheless, the analyzing bloc 9 of high security level components behaves always as expected no matter whether the malicious data comes from the second protocol adapter 12 within the second domain 7 or from the self-testing component 35.

It should be noted that the components forming the security module 14 can be structured into different domains or groups. The belonging of a component to a group depends on whether the gateway data crossing that component does or doesn't undergo any security checks on an application-level. The components of the first network interface 25 along with the first receiving bloc 11 and the first transmitting bloc 17 are part of the same security group as the first domain 5 to which they have direct communication and thus form a high security group. In contrast, the components of the second network interface 27, the second receiving bloc 13 and the second transmitting bloc 15 are part of a low security group like the second domain 7 to which they have direct communication. The elementary components responsible for analyzing the gateway data flow (i.e., the elementary components of the analyzing bloc 9) belong to a security critical group. These elementary components are configured to implement strong security rules during exchange of data. They are used as validation objects for the gateway data flow and, by their function, are changing the security level of the gateway data from one end of the security module 14 to the other.

Finally, the audit 31, monitoring 33 and self-testing 35 components make part of a third group responsible for the internal well-functioning of the security module 14.

Advantageously, this repartition of components into different groups enables to clearly define the boundaries with respect to the security critical group containing a small set of well identified elementary components that are the only ones allowed to downgrade or upgrade the security level of the gateway data flow.

In other respects, it is to be noted that the first objective of the gateway 1 is to protect the domain of high security level (i.e., first domain 5) against any data corruption attempt or any attack on the system's integrity. Once the integrity is guaranteed, the second objective is to protect the availability of that domain. Finally, once the first two objectives are achieved, the third objective is to fulfill the gateway's ordinary function comprising allowing communication between the two domains 5, 7. The order of these objectives illustrates their respective importance and thus a communication between two domains is easily laid down in order to preserve the integrity of the high security domain 5.

Hereafter is given an example to illustrate the steps of data exchange between the first and second domains 5, 7 with reference to the gateway architecture of FIG. 3.

It is supposed that a first application in the first domain 5 sends a request message to a second application located in the second domain 7 asking for a given file and that the latter responds to that request after receiving the message.

The request from the first domain 5 is adapted by the first protocol adapter 10 from an applicative protocol format into a gateway internal protocol format. When the adapted request is received at the first network interface component 25, the flow of gateway data corresponding to that adapted request is transmitted by the latter to the first elementary stack receiver component 111. The incoming flow of gateway data is processed by the first elementary stack receiver component 111 according to the gateway internal protocol 8. The first elementary stack receiver component 111 interprets the format of each gateway data frame into separate gateway data fields which are then sent to the first elementary flow security receiver component 113. The gateway data fields are gathered by the first elementary flow security receiver component 113. In particular, this component builds the gateway data internally based on the received packets by copying the important fields of gateway data. Moreover, network security rules are applied on the copied useful fields. Advantageously, each rule may be implemented by an elementary subcomponent (not shown) of the first elementary flow security receiver component. These network security rules enable, for example, the elimination of unauthorized destinations and/or sources, as well as malformed fields at the network level, according to an Open System Interconnection (OSI) model. Of course, other network security checks may also be conducted.

Once the useful flow of gateway data fields is authorized at the network level, it is sent to the first elementary flow dispatch receiver component 115 which, on the basis of one field (for example, the destination UDP port or any other field allowing to determine the application-level protocol), decides if such application protocol is authorized or not. If the application protocol is authorized, then the gateway data flow is sent to one of the elementary observing components 911a-911c (for example, 911a) in function of the associated application-level protocol. Advantageously, before sending the gateway data flow, the activity of the elementary observing component 911a is checked by the monitoring component 33. Indeed, if the elementary observing component 911a has been detected to be non-active, then it is disabled and does not receive any data.

Given that the gateway 1 of this first embodiment is intended to protect the integrity of the first domain 5 which is not malicious and is guaranteed to be a trusted source, then the gateway data flow from the first protocol adapter 10 into the second protocol adapter 12 within the second domain 7 does not need to be strongly analyzed from the security point of view. Thus, the flow of gateway data fields can be transmitted without further analysis to the second elementary flow transmitter component 151. However, the role of each elementary observing component (911a-911c) comprises gathering communication details and sending them to an associated stateful context component (951-955) so that the latter can be consulted by a corresponding elementary filtering component (933a-933c) in the opposite direction via the second path 21 of communication. For example, the elementary observing component 911a notes in the corresponding stateful context component 951 details about the request made by the first domain 5 concerning a given file.

Then, the second elementary flow transmitter component 151 gathers gateway data fields from all the elementary observing components 911a-911c. It assembles the different gateway data fields into gateway data frames before sending them to the second elementary stack transmitter component 153 which in its turn send them to the second protocol adapter 12 via the second network interface component 27 and the second data link 22. The second protocol adapter 12 within the second domain 7 reconstruct the message according to the applicative protocol format out of the corresponding gateway data.

In the opposite direction (i.e., for the flow of data from the second protocol adapter 12 within the second domain 7 to the first protocol adapter 10 within the first domain 5 along the second path 21), the second protocol adapter 12, the second receiving bloc 13 and the first transmitting bloc 17 perform steps similar to those of the first protocol adapter 10, the first receiving bloc 11 and the second transmitting bloc 15.

Indeed, when the adapted response message sent by the second protocol adapter 12 is received at the second network interface 27, the flow of gateway data corresponding to that adapted response is transmitted to one of the second set of associated elementary filtering components 933a-933c (for example, 933a) in function of the associated application-level protocol via the second receiving bloc 13. The adapted response message undergoes operations conducted by the elementary components of the second receiving bloc 13 equivalent to those of the corresponding components of the first receiving bloc 11. Advantageously, the validity of each elementary filtering component (933a-933c) is also checked before it is allowed to receive the response data.

The second domain 7 is considered to be less trustful than the first domain 5 and potentially it might generate malicious data flows. Therefore, in order to protect the integrity of the first domain 5, the gateway data flow coming from the second protocol adapter 12 within the second domain 7 is strongly analyzed by the second set of elementary filtering components 933a-933c. Indeed, for each application-level protocol the current gateway data fields are checked by a series of rules, each rule would be applied to one or more fields. If only one of these rules is not respected, then the current flow of gateway data fields is rejected or dropped.

At least one of the rules comprises consulting the corresponding stateful context component 951-955 so as to be sure that only authorized requests containing correct data are permitted. For example, if the answering message coming from the second domain 7 contains a given file, in that case the elementary filtering component 933a consults the corresponding stateful context component 951 to check whether that file was previously requested by the first domain 5 and if it was not requested, then the answering message would be simply rejected or dropped. It should be noted that in addition to consulting the stateful context components 951-955, the elementary filtering components 933a-933c implement strong security rules at application protocol level as it is the key point to protect the high security of the first domain 5 from wrong or malicious data received from the low security second domain 7.

Once the adapted answering message is authorized by the corresponding application-level component of the second set of elementary filtering components 933a-933c, it is sent to the components of the first transmitting bloc 17 which process the gateway data in the same manner as those of the second transmitting bloc 15 before sending it to the first protocol adapter 10 via the first network interface component 25 and the first data link 20. The first protocol adapter 10 within the first domain 5 reconstruct the answering message according to the applicative protocol format out of the corresponding gateway data.

The above example concerned a method authorizing bidirectional communication between a first domain 5 of high security level and a second domain 7 of low security level. It is evident that this method can be extended to the case where the first domain 5 also communicates with a third domain (not shown) having a lower security level. The elementary components as those depicted in FIG. 3 can be used to implement the bidirectional communication with the third domain. Indeed, the same elementary components can be used or duplicated to enable a bidirectional communication between high security level domains and low security level domains.

Moreover, by providing elementary observing and filtering components in both opposite directions, a bidirectional communication between two domains having the same security levels can be achieved. Indeed, two domains may both have high security levels without necessarily trusting each other for different reasons. For example, the communication between them may cross non trusted domains.

Figure 5:
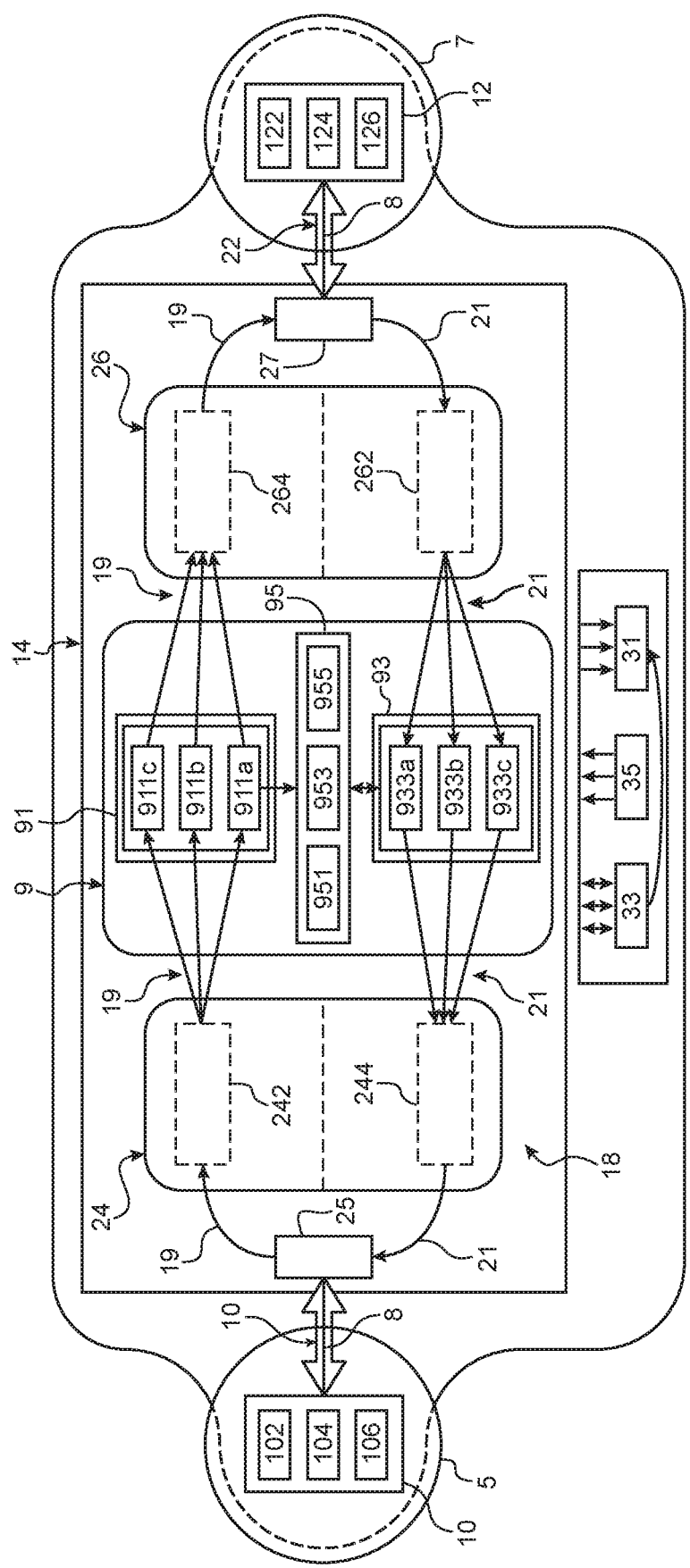
FIG. 5 schematically illustrates a gateway adapted to interconnect first and second domains with different security levels according to a second embodiment of the invention.

FIG. 5 schematically illustrates a variant of the gateway depicted in FIG. 3. According to this variant, the first driving bloc 24 is made up of a single bloc comprising a first input buffer 242 and a first output buffer 244 separated from each other. The separation between the input and output buffers 242, 244 is guaranteed by a hardware component IOMMU (Input Output Memory Management Unit). The first network interface component 25 is connected to the first driving bloc 24 and the second network interface component 27 is connected to the second driving bloc 26. The first and second network interface components 25, 27 are configured to communicate with the first and second protocol adapters 10, 12 respectively. Indeed, the first input buffer 242 is configured to receive gateway data from the first protocol adapter 10 via the first data link 20 and the first network interface component 25 and the first output buffer 244 is configured to send gateway data to the first protocol adapter 10 via the first network interface component 25 and the first data link 20.

Similarly, the second driving bloc 26 is made up of a single bloc comprising a second input buffer 262 configured to receive gateway data from the second protocol adapter 12 via the second network interface component 27 and a second output buffer 264 configured to send gateway data to the second protocol adapter 12 also via the second network interface component 27. The second input and output buffers 262, 264 are also separated from each other thanks to the IOMMU.

Figure 6:
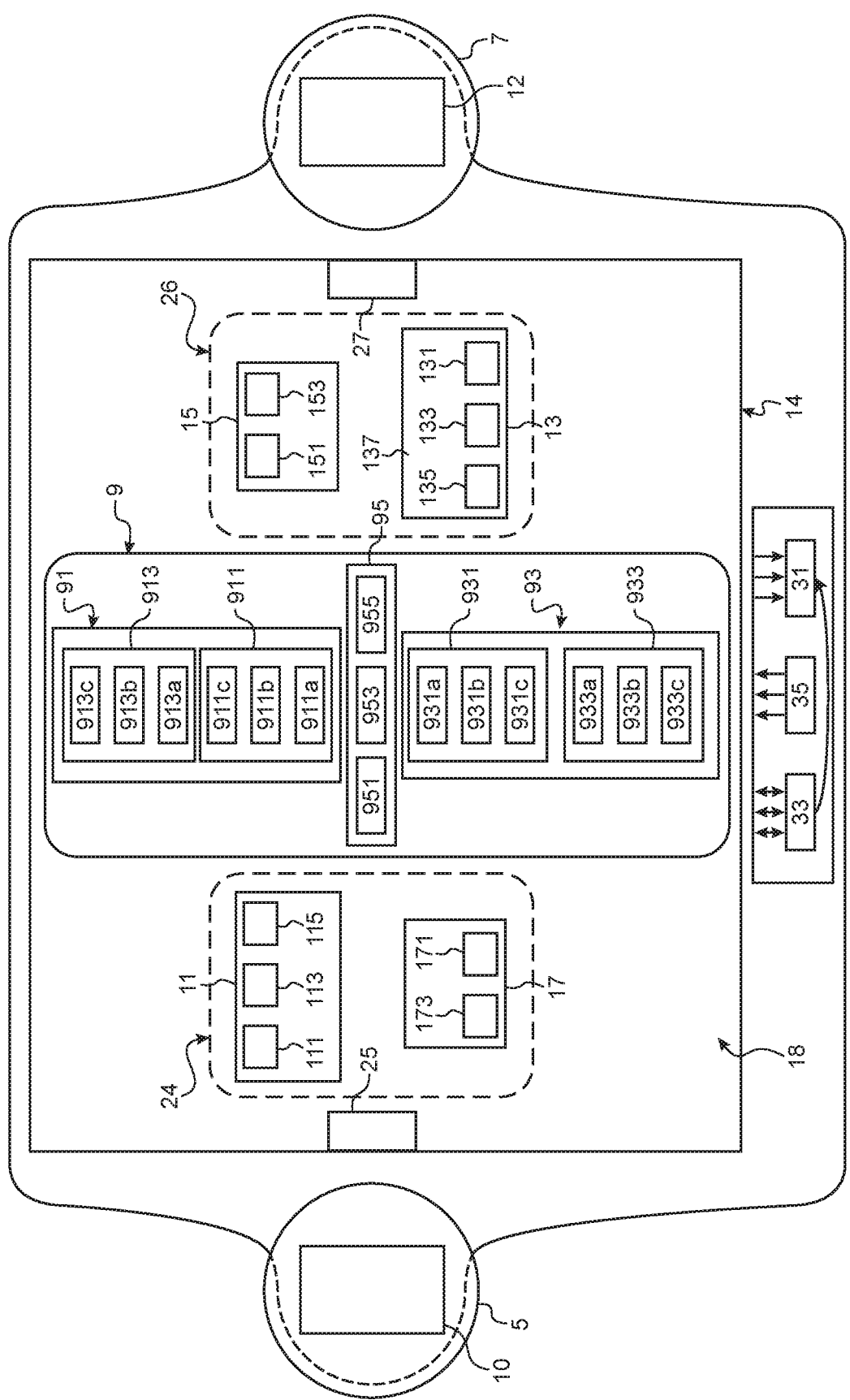
FIG. 6 schematically illustrates a gateway adapted to interconnect first and second domains according to a third embodiment of the invention.

FIG. 6 schematically illustrates a gateway 1 adapted to interconnect first and second domains 5, 7 according to a third embodiment of the invention. The two domains 5, 7 may have the same or different security levels.

The gateway 1 according to this embodiment is the same as that of FIG. 3 except that the analyzing bloc 9 comprises equivalent elementary components along the two different paths.

Indeed, the analyzing bloc 9 comprises first and second sets of elementary controlling components 91, 93 and a set of associated elementary stateful context components 95. The first set of elementary controlling components 91 comprises a first set of elementary observing components 911a-911c and a first set of elementary filtering components 913a-913c. The second set of elementary controlling components 93 comprises a second set of elementary observing components 931a-931c and a second set of elementary filtering components 933a-933c.

In particular, the second set of elementary observing components 931a-931c are configured to gather information on gateway data flowing along the second path 21 (i.e., from the second protocol adapter 12 to the first protocol adapter 10) and to transmit it to the associated set of stateful context components 951-955. The first set of elementary filtering components 913a-913c are configured to implement a series of application-level security rules comprising second consulting rules intended to consult the information stored in the associated set of stateful context components.

The gateway architecture according to the present invention allows most of its components and elementary components to be developed independently of each other. The only constraint being the respect of the gateway internal protocol format between the first protocol adapter 10 and the security module 14 as well as between the security module 14 and the second protocol adapter 12. Each elementary component has a well-defined role and specified interfaces with the other elementary components. Each elementary component is designed to have a very small number of functions such that its implementation is easily done and easily verified. The first and second protocol adapters 10, 12 can be easily updated to allow any applicative-level protocol as long as that protocol can be transformed into the gateway internal protocol without losing data. Thus, the security module 14 can be considered as made up of a set of elementary components and new components can be added at any time.

In particular, elementary components of the analyzing bloc 9 are completely independent from the other elementary components of the gateway. Thus, any new application-level function can be implemented into a partition or several partitions corresponding to a new elementary component that can be easily introduced in the in the security module 14 of the gateway. It is only needed to define the associated protocol of the application-level filtering function in the configuration of the elementary flow dispatch components so as to be recognized, to provide inter-partition communication with the one or ones implementing the new application-level filtering function, and to update the first and second protocol adapters 10, 12 to manage the new application-level protocol and transform it into the gateway internal protocol and vice versa. The elementary application-level filtering components are also independent from each other. Indeed, a filtering of one protocol does not interfere in any way with a filtering of another protocol. Thus, the development of an application-level filtering can be done at any moment and independently of any other component's development. Its integration into the gateway is very simple and its certification can also be done independently. Thus, the gateway can be updated and its functions enhanced throughout its lifetime. Indeed, by using incremental and independent certification methodologies, the modification of an existing component or the integration of new components certified independently allow the gateway to be easily updated without starting from scratch.

The gateway architecture has been described by focusing on the integrity aspects concerning the protection of a domain's assets. However, the same gateway architecture can be equally used to protect availability, and/or confidentiality and/or non-repudiation.

The gateway according to the present invention is advantageously used in an embedded infrastructure. In particular, it is adapted to be used in an aircraft communication system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A gateway adapted to interconnect a first domain to a second domain, comprising:
    memory,
    first and second protocol adapter code hosted respectively within the first and second domains and configured to make a conversion between an application data formatted according to an applicative protocol relative to said first and second domains and a gateway data formatted according to a gateway internal protocol, and
    a hosting platform that is a virtualization platform, the hosting platform being physically segregated from said first domain and connected to said first domain by a first data link and physically segregated from said second domain and connected to said second domain by a second data link, said hosting platform comprising:
        a first network interface coupled to the first domain for communicating with the first data link;
        a second network interface coupled to the second domain for communicating with the second data link;
        a first set of one or more partitions hosted on the virtualization platform comprising a first set of one or more components of code being executable by the virtualization platform to cause the virtualization platform to receive gateway data from, but not send the gateway data to, the first data link along a first secure unidirectional path;
        a second set of one or more partitions hosted on the virtualization platform comprising a second set of one or more components of code being executable by the virtualization platform to cause the virtualization platform to receive the gateway data from, but not send the gateway data to, the first set of one or more partitions along the first secure unidirectional path, and to analyze the received gateway data according to a series of security rules at the gateway internal protocol level;
        a third set of one or more partitions hosted on the virtualization platform comprising a third set of one or more components of code being executable by the virtualization platform to cause the virtualization platform to receive the gateway data from, but not send the gateway data to, the second set of one or more partitions along the first secure unidirectional path and to forward the gateway data to, but not receive the gateway data from, the second data link along the first secure unidirectional path;
        a fourth set of one or more partitions hosted on the virtualization platform comprising a fourth set of one or more components of code being executable by the virtualization platform to cause the virtualization platform to receive gateway data from, but not send the gateway data to, the second data link along a second secure unidirectional path;
        a fifth set of one or more partitions hosted on the virtualization platform comprising a fifth set of one or more components of code being executable by the virtualization platform to cause the virtualization platform to receive the gateway data from, but not send the gateway data to, the fourth set of one or more partitions along the second secure unidirectional path, and to filter the received gateway data according to a series of application-level security rules;
        a sixth set of one or more partitions hosted on the virtualization platform comprising a sixth set of one or more components of code being executable by the virtualization platform to cause the virtualization platform to receive the gateway data from, but not send the gateway data to, the fifth set of one or more partitions along the second secure unidirectional path and to forward the gateway data to, but not receive the gateway data from, the first data link along the second secure unidirectional path;
    wherein said second set of one or more partitions further causes the virtualization platform to gather information on gateway data flowing along said first unidirectional path;
    wherein said fifth set of one or more partitions causes the virtualization platform to implement a first series of application-level security rules before allowing or disallowing the flow of gateway data from the second protocol adapter towards the first protocol adapter along the second unidirectional path, said first series of application-level security rules comprising first consulting rules intended to consult the information gathered by said second set of one or more partitions; and
    wherein first and second protocol adapters hosted respectively within the first and second domains and configured to make a conversion between an application data formatted according to an applicative protocol relative to said first and second domains and a gateway data formatted according to a gateway internal protocol, wherein said first and second protocol adapter code comprise seventh and eighth sets of one or more components of code decomposed into a plurality of subsets of elementary components of code and being executable by the first and second domains, respectively.

2. The gateway according to claim 1, wherein each of the first, second, third, fourth, fifth, and sixth sets of one or more partitions are decomposed into a plurality of subsets of predefined elementary components of code, each comprising a plurality of lines of code having a code complexity sufficiently small as to be analyzable at a desired level of assurance, wherein each elementary component has a specified function and is adapted to communicate with other predefined elementary components.

3. The gateway according to claim 1, wherein said gateway internal protocol is configured to have a minimum communication protocol based on a query and a response exchange mechanism and wherein each frame of an exchanged gateway data is decomposed into predefined fields of a fixed length.

4. The gateway according to claim 3 wherein the gateway internal protocol is of the type RPC (Remote Procedure Call).

5. The gateway according to claim 1, wherein said seventh and eighth sets of one or more components of code are executable by the first and second domains, respectively, to cause the first and second domains, respectively, to:
manage authorized applicative protocols relative to applications belonging to the first and second domains, respectively,
construct a gateway data out of a corresponding application data by adapting the application data from an applicative protocol format into said gateway internal protocol format before sending said gateway data to the first and second data links, respectively, and
reconstruct an application data according to the applicative protocol format out of a corresponding gateway data formatted according to the internal gateway protocol.

6. The gateway according to claim 1, wherein said fifth set of one more partitions causes the virtualization platform to implement the series of security rules at the gateway internal protocol level on the gateway data flowing along the second unidirectional path to ensure that no malicious or unauthorized gateway data is flowing along the second unidirectional path.

7. The gateway according to claim 1, wherein said fifth set of one or more partitions further causes the virtualization platform to gather information on gateway data flowing along said first unidirectional path and to transmit it to the fifth set of one or more partitions, and in that said second set of one or more partition further causes the virtualization platform to implement a second series of application-level security rules comprising second consulting rules intended to consult the information stored in said associated set of stateful context components.

8. An embedded infrastructure comprising a gateway adapted to interconnect a first domain to a second domain, the gateway comprising:
memory,
first and second protocol adapter code hosted respectively within the first and second domains and configured to make a conversion between an application data formatted according to an applicative protocol relative to said first and second domains and a gateway data formatted according to said gateway internal protocol, and a hosting platform that is a virtualization platform, the hosting platform being physically segregated from said first domain and connected to said first domain by a first data link physically segregated from said second domain and connected to said second domain by a second data link, said hosting platform comprising:
a first network interface coupled to the first domain for communicating with the first data link;
a second network interface coupled to the second domain for communicating with the second data link;
a first set of one or more partitions hosted on the virtualization platform comprising a first set of one or more components of code being executable by the virtualization platform to cause the virtualization platform to receive gateway data from, but not send the gateway data to, the first data link along a first secure unidirectional path;
a second set of one or more partitions hosted on the virtualization platform comprising a second set of one or more components of code being executable by the virtualization platform to cause the virtualization platform to receive the gateway data from, but not send the gateway data to, the first set of one or more partitions along the first secure unidirectional path, and to analyze the received gateway data according to a series of security rules at the gateway internal protocol level;
a third set of one or more partitions hosted on the virtualization platform comprising a third set of one or more components of code being executable by the virtualization platform to cause the virtualization platform to receive the gateway data from, but not send the gateway data to, the second set of one or more partitions along the first secure unidirectional path and to forward the gateway data to, but not receive the gateway data from, the second data link along the first secure unidirectional path;
a fourth set of one or more partitions hosted on the virtualization platform comprising a fourth set of one or more components of code being executable by the virtualization platform to cause the virtualization platform to receive gateway data from, but not send the gateway data to, the second data link along a second secure unidirectional path;
a fifth set of one or more partitions hosted on the virtualization platform comprising a fifth set of one or more components of code being executable by the virtualization platform to cause the virtualization platform to receive the gateway data from, but not send the gateway data to, the fourth set of one or more partitions along the second secure unidirectional path, and to filter the received gateway data according to a series of application-level security rules;
a sixth set of one or more partitions hosted on the virtualization platform comprising a sixth set of one or more components of code being executable by the virtualization platform to cause the virtualization platform to receive the gateway data from, but not send the gateway data to, the fifth set of one or more partitions along the second secure unidirectional path and to forward the gateway data to, but not receive the gateway data from, the first data link along the second secure unidirectional path;

wherein said second set of one or more partitions further causes the virtualization platform to gather information on gateway data flowing along said first unidirectional path;

wherein said fifth set of one or more partitions causes the virtualization platform to implement a first series of application-level security rules before allowing or disallowing the flow of gateway data from the second protocol adapter towards the first protocol adapter along the second unidirectional path, said first series of application-level security rules comprising first consulting rules intended to consult the information gathered by said second set of one or more partitions; and wherein said first and second protocol adapter code comprise computing modules respectively including seventh and eighth sets of one or more components of code decomposed into a plurality of subsets of elementary components of code and being executable by the first and second domains, respectively.

9. An aircraft communication system comprising a gateway adapted to interconnect a first domain to a second domain, the gateway comprising:

memory, first and second protocol adapter code hosted respectively within the first and second domains and configured to make a conversion between an application data formatted according to an applicative protocol relative to said first and second domains and a gateway data formatted according to said gateway internal protocol, and a hosting platform that is a virtualization platform, the hosting platform being physically segregated from said first domain and connected to said first domain by a first data link and physically segregated from said second domain and connected to said second domain by a second data link, said hosting platform comprising:

a first network interface coupled to the first domain for communicating with the first data link;

a second network interface coupled to the second domain for communicating with the second data link;

a first set of one or more partitions hosted on the virtualization platform comprising a first set of one or more components of code being executable by the virtualization platform to cause the virtualization platform to receive gateway data from, but not send the gateway data to, the first data link along a first secure unidirectional path;

a second set of one or more partitions hosted on the virtualization platform comprising a second set of one or more components of code being executable by the virtualization platform to cause the virtualization platform to receive the gateway data from, but not send the gateway data to, the first set of one or more partitions along the first secure unidirectional path, and to analyze the received gateway data according to a series of security rules at the gateway internal protocol level;

a third set of one or more partitions hosted on the virtualization platform comprising a third set of one or more components of code being executable by the virtualization platform to cause the virtualization platform to receive the gateway data from, but not send the gateway data to, the second set of one or more partitions along the first secure unidirectional path and to forward the gateway data to, but not receive the gateway data from, the second data link along the first secure unidirectional path;

a fourth set of one or more partitions hosted on the virtualization platform comprising a fourth set of one or more components of code being executable by the virtualization platform to cause the virtualization platform to receive gateway data from, but not send the gateway data to, the second data link along a second secure unidirectional path;

a fifth set of one or more partitions hosted on the virtualization platform comprising a fifth set of one or more components of code being executable by the virtualization platform to cause the virtualization platform to receive the gateway data from, but not send the gateway data to, the fourth set of one or more partitions along the second secure unidirectional path, and to filter the received gateway data according to a series of application-level security rules;

a sixth set of one or more partitions hosted on the virtualization platform comprising a sixth set of one or more components of code being executable by the virtualization platform to cause the virtualization platform to receive the gateway data from, but not send the gateway data to, the fifth set of one or more partitions along the second secure unidirectional path and to forward the gateway data to, but not receive the gateway data from, the first data link along the second secure unidirectional path;

wherein said second set of one or more partitions further causes the virtualization platform to gather information on gateway data flowing along said first unidirectional path;

wherein said fifth set of one or more partitions causes the virtualization platform to implement a first series of application-level security rules before allowing or disallowing the flow of gateway data from the second protocol adapter towards the first protocol adapter along the second unidirectional path, said first series of application-level security rules comprising first consulting rules intended to consult the information gathered by said second set of one or more partitions; and wherein said first and second protocol adapter code comprise computing modules respectively including seventh and eighth sets of one or more components of code decomposed into a plurality of subsets of elementary components of code and being executable by the first and second domains, respectively.

* * * * *